April 15, 1958   A. C. BALLAUER   2,830,552
PROGRESSIVELY COLLAPSIBLE MANDREL
Filed Feb. 19, 1954
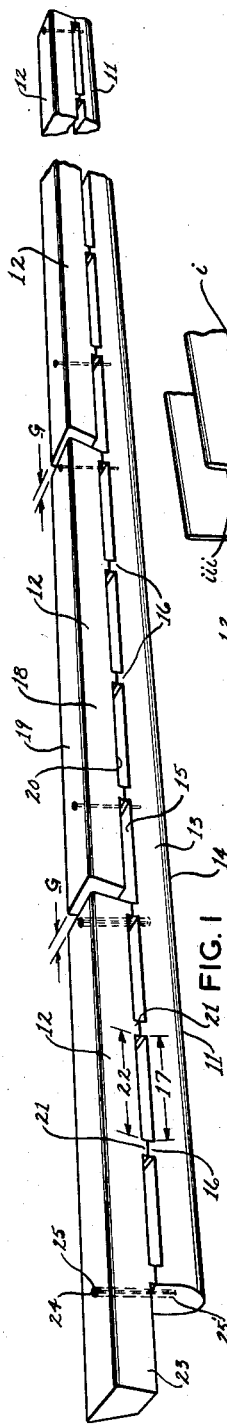
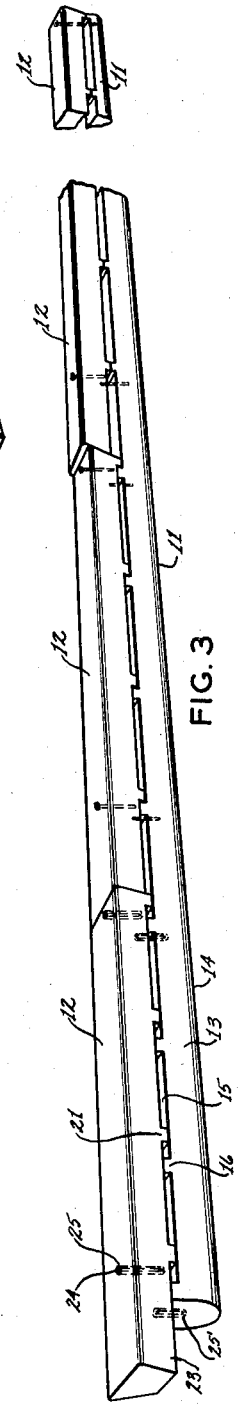
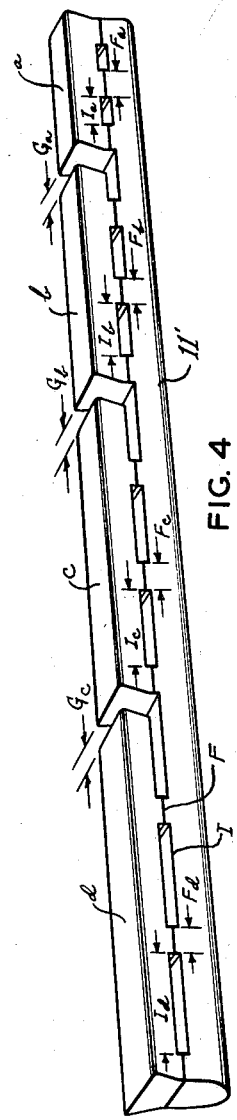
INVENTOR
ALB C. BALLAUER
BY Jerome A. Gross,
ATTORNEY United States Patent Office 2,830,552
Patented Apr. 15, 1958

2,830,552

PROGRESSIVELY COLLAPSIBLE MANDREL

Alb C. Ballauer, Traverse City, Mich., assignor to Parsons Corporation, Detroit, Mich., a corporation of Michigan Application February 19, 1954, Serial No. 411,403

6 Claims. (Cl. 113—111)

This invention relates to mandrels over which elongated tubular work may be fabricated; and it has particular application to the manufacture of brazed steel spars for helicopter rotor blades.

In order to braze the spanwise joints of such a spar continuously and without voids, the work pieces to be joined and the brazing material must first be positioned with precision. Such positioning may be accomplished most conveniently by the use of an interior mandrel. However, shrinkage and warpage, attendant to the brazing of two elongated pieces together, serves to grasp an interior mandrel tightly between them, requiring that it be partially collapsed before it can be removed.

The principal object of the present invention is to provide a mandrel assembly having a series of individual mandrel segments which may be progressively dislodged into collapsed position.

A further object is to provide a collapsible mandrel assembly wherein the friction to be overcome at any stage of the collapsing operation will be at a minimum.

A still further object is to provide a simple mandrel assembly which is readily collapsible progressively by application of a relatively small force to either end.

An additional object is to provide an assembly including individual mandrel segments and detent means by which their positioning with reference to each other will remain undisturbed during the arrangement of the work pieces prior to and during the joining thereof.

A still further object is to provide a method of fabricating elongated tubular assemblies by arranging open-sided work pieces on the outer surface of the element of a mandrel assembled in extended position, collapsing the mandrel progressively, and removing it endwise from the fabricated tubular assembly.

These and other objects, and the manner of their accomplishment, will be apparent from the specification and claims which follow.

In the accompanying drawings:

Figure 1 is a perspective view of a preferred mandrel construction adapted to be collapsed from either end, the mandrel assembly shown assembled in extended position.

Figure 2 is a fragmentary endwise perspective view showing the mandrel assembly of Figure 1 in position in the leading edge assembly of a rotor spar as set up for the brazing thereof.

Figure 3 is a perspective view similar to Figure 1, showing the mandrel assembly thereof partially collapsed from left to right.

Figure 4 is a schematic perspective illustrating a modified form of mandrel adapted to be collapsed from left to right only, dimensioned by symbols referred to hereinafter.

The mandrel assembly of the present invention includes an elongated mandrel half, generally designated 11, shown in lower position in Figures 1, 2 and 3. It is referred to as a mandrel "half" because it extends substantially the full length of the work and functions in opposition to all the mandrel segments, designated 12. The mandrel half 11 includes a body portion 13, a work-engaging surface 14, and opposite thereto an inner side 15, shown as presented upward.

The surface of inner side 15 of the mandrel half 11 is preferably smooth and generally planar, save for a series of low, short-faced projections 16 which extend upward, as shown in Figure 1, and terminate in a plane parallel to that of the inner side 15. The spaces on the side 15 between successive faced projections 16 are referred to as intervals 17, the length of which will be hereinafter discussed. In the preferred embodiment shown in Figure 1, the short-faced projections 16 are equal, and the length of the intervals 17 separating them is constant over the entire length of the mandrel half 11.

Each of the mandrel segments 12 includes a segment body portion 18, a segment work-engaging surface 19 and a segment inner side 20, shown as facing downward. The segment work-engaging surfaces 19 are opposite the work-engaging surface 14 of the mandrel half 11; when the mandrel assembly is in extended position, they serve together as the "working surface" which holds the work during fabrication. The segment inner sides 20 together correspond to the inner side 15 of the mandrel half 11. Each segment inner side 20 has two or more faced segment projections 21, extending an equal distance to that of the faced projections 16 of the mandrel half 11 and of corresponding length. The portions of the segment inner sides 20 which separate the projections 21 are designated as segment intervals 22; they correspond in length to the intervals 17 of the mandrel half 11 which they face when in mandrel-extended position.

Each of the mandrel segments 12 has at one end of the body portion 18 a segment overhang portion 23. For purpose of collapsing the mandrel assembly, the length of such overhang portions 23 is related to the length of the segment intervals 22 and of the short segment projections 21, as will be apparent from the discussion which follows.

In the preferred embodiment shown in Figures 1, 2 and 3, the mandrel segments 21 are identical with each other and therefore interchangeable. This is in contrast with the modified mandrel assembly shown in Figure 4.

Referring to Figure 2, a helicopter blade curved leading edge plate, designated *i*, is shown facing downward, and supported by a fixture *ii*. The mandrel half 11 is inserted with its work-engaging surface 14 nested in the curve of the leading edge plate *i*. The mandrel segments 21 are then aligned there in succession, as shown in Figure 1, with their faced projections 21 resting in registration upon its faced projections 16. In such alignment there will be a gap, designated G, between each overhang portion 23 and the adjacent end of the next segment's body portion 18.

In order to hold the mandrel segments 12 in position on the mandrel half 11 pending assembly of the work pieces, a couple of shear pins 24 may be employed, loosely placed in corresponding lower and upper bores 25, 25' in opposite projections of the mandrel half 11 and each of the mandrel segments 12. A channel shear web designated *iii* may then be positioned with its flanges adjacent the inner surface of the curved leading edge plate *i*, as shown in Figure 2; brazing material (not shown) applied; and the assembly then brazed by the application of heat in suitable fashion.

The brazing of such an elongated assembly will necessarily be accompanied by some shrinking and warpage, which tend to bind interior mandrels within the work. Nevertheless, the mandrel assembly here shown may be removed with relative ease in the manner now to be described.

The segment overhang portion 23 which projects from the end of the assembly, as in Figure 2, may be hammered inward, shearing its shear pins 24 and moving sufficiently to dislodge the segment projections 21 of such end segment from their position upon the faced projections 16 of the mandrel half 11. When this outer segment has been dislodged, its projections 21 will nest inwardly adjacent the mandrel half projections 16, and the faces thereof will rest in surface contact with the intervals 17. The gap G inward of such end segment will then be fully or substantially closed. The overhang portion 23 of such outer segment may be then hammered further inward, so that its inner segment end will push against the end of the segment overhang portion 23 of the next inboard segment, causing it to be similarly dislodged, so that its faced projections 21 will nest inboard of the projections 16 of the mandrel half 11 which they had theretofore abutted. Meanwhile, the outer end segment will have moved inward so that its projections 21 are no longer immediately adjacent the projections 16 of the mandrel half 11. Figure 3 shows the position of the elements in this partially-collapsed stage.

Such outer end segment is then hammered further inward; and the segments progressively inboard are successively dislodged into collapsed position, in endwise contact with each other. In this collapsing operation the outer end segment will have moved the entire length of an interval 17, 22. Using gaps G each equal to the length of a faced projection 16, 21 increased by some tolerance, the length of the intervals 17, 22 must be as great as the product of such increased gap length and the number of mandrel segments 12. When all the segments 12 have been dislodged into collapsed position, they will sufficiently withdraw from contact with the channel shear web *iii* to permit the entire mandrel assembly to be removed endwise from the brazed spar.

The principal advantage attendant to the use of such a collapsible mandrel assembly is the small friction force which must be overcome at any one time in progressively dislodging the successive mandrel segments. Another feature, obvious on examining Figures 1 and 3, is that the collapsing operation may be begun from either end of the mandrel assembly. In the usual case, where the required mandrel rigidity does not vary over the span, the embodiment heretofore described is both simple in construction and most effective in operation.

The alternate form of mandrel assembly illustrated in Figure 4 is not deemed desirable from the standpoint of manufacture, nor does it provide equal rigidity along the mandrel length. It is illustrated herein rather to show the dimensional relationships necessary to accomplish the retraction of a mandrel assembly collapsible in one direction only.

In Figure 4 there is shown a mandrel half 11', extending the full length of the work to be supported, and a plurality of mandrel segments *a, b, c, d,* which in this case are of unequal length. The lettering of the mandrel segments *a, b, c, d* is from inboard to outboard, as contrasted with the direction of collapse which is from outboard to inboard. This distinction should be borne in mind in order to understand the following discussion.

The mandrel half 11' has a plurality of low, short faced projections designated F; the mandrel segments *a, b, c, d,* have similar short, faced projections $F_a$, $F_b$, $F_c$, $F_d$. The projections $F_a$ of the mandrel segment *a* are all of equal length; the projections $F_b$ of the segment *b* are all of equal length but need not be the same length as the projections $F_a$. Here, as in the discussion of Figure 1, the term "length" refers to the dimension along the length of the mandrel half, not to the height of the projections. The length of each projection F of the mandrel half 11' is equal to the length of a projection of the mandrel segment *a, b, c* or *d* which rests thereon in the mandrel-extended position, as illustrated. Thus, in Figure 4 the dimensions $F_a$, $F_b$, etc., refer to the length of the projections of the mandrel segments *a, b,* etc., as well as their corresponding projections on the mandrel half 11'.

The several projections are separated by intervals I, similar in function to the intervals 17 shown in the embodiment of Figure 1. Intervals between projections of each individual segment *a, b, c, d,* are constant for the particular segment, and are designated $I_a$, $I_b$, etc.

In order to permit the segment *a* to be dislodged to the right from the position shown in Figure 4, the following relationship is apparent:

(1) $\qquad I_a \geqq F_a$

There is a gap G on the outboard side of each segment between it and the next segment. In the notation here employed, each gap G is dimensioned along with the segment next inboard thereof, that is, as $G_a$, $G_b$, etc.

The length of any gap G is necessarily equal to or greater than the length of a projection F of the segment *a, b, c* or *d* on the outboard side of the gap, otherwise the outboard segment could not be dislodged without moving the inboard section somewhat. This dimensional relationship may be expressed with relation to the gap width at a station *x* (dimensioned from the inboard end) as follows:

(2) $\qquad G_x \geqq F_{x+1}$

The necessary length of any interval $I_x$ (dimensioned from the inboard end) is the total of the projection length $F_x$ of the segment *x* plus the total of the gaps G inboard thereof, thus:

(3) $\qquad I_x \geqq F_x + \Sigma G^{x-1}$

The principles 1, 2 and 3 apply to the preferred embodiment shown in Figure 1; it is a special case within these principles under which collapse in either direction is possible. Besides, it possesses obvious practical advantages over embodiments having unequal intervals I, unequal faced projections F, unequal gaps G, or any combination thereof.

Accordingly, the present invention should not be limited to the specific structures here illustrated, but should be deemed as fully co-extensive with the inventive principles disclosed.

I claim:

1. A progressively collapsible mandrel assembly adapted to support work when in extended position and to be removable endwise from the work when in collapsed position, comprising a mandrel half having a body portion and a plurality of abutment faces projecting from one side thereof, in combination with a plurality of mandrel segments, each segment having a body portion and two or more abutment faces projecting from one side thereof, the said segments being adapted to be arranged in alignment along the mandrel half and to be positioned in mandrel-extended position with their projecting abutment faces in registration with and abutting the abutment faces of the mandrel half, the said segments being of such length that in such mandrel-extended position the adjacent ends of successive segments are separated by equal gaps each of a length substantially equal to the width of a projecting abutment face, the spacing between adjacent projecting abutment faces of the mandrel half and of each mandrel segment being substantially equal to the product of such gap length times the number of said segments.

2. A progressively collapsible mandrel assembly adapted to support work when in extended position and to be removable endwise from the work when in collapsed position, comprising a mandrel half having a body portion and a plurality of abutment faces of equal length projecting from one side thereof, in combination with a plurality of mandrel segments, each segment having a body portion and two or more abutment faces of similar length projecting from one side thereof, the said segments being adapted to be arranged in alignment along the mandrel half and to be positioned in mandrel-extended position with their projecting abutment faces in registration with and abutting the abutment faces of the mandrel half, the said segments being of such length that in such mandrel-extended position the adjacent ends of successive segments are separated by substantially equal gaps of a length equal to the length of a projecting abutment face, the spacing between adjacent projecting abutment faces of the mandrel half and of each mandrel segment being substantially equal to the product of such gap length times the number of said segments, whereby the inward displacement of either end segment a distance equal to the length of an abutment face will dislodge the abutment faces of said segment from abutment and registration with the corresponding abutment faces of the mandrel half, and allow said dislodged end segment to assume collapsed position with its dislodged abutment faces adjacent the body portion of the mandrel half and with its inner end closely adjacent the end of the next segment, and whereby further inward displacement of said end segment will slide it inward and cause its inner end to push against and dislodge the adjacent segment into similar collapsed position with its inner end in turn closely adjacent the next adjacent segment; so that displacement of the end segment so dislodged a distance equal to the interval between adjacent abutment faces will collapse all the segments progressively and permit removal of the assembly from the work.

3. A progressively collapsible mandrel assembly comprising a mandrel half having a body portion, faced projections of equal height projecting from one side thereof and side faces alternating with and adjacent to said projections, further comprising a plurality of mandrel segments, each having a body portion, two or more correspondingly spaced, faced projections of similar height and equal length, and side faces alternating therewith, the mandrel segments being adapted to be positioned along the length of the mandrel half with their projections opposed to and in registration with the projections of the mandrel half and with the adjacent ends of their body portions spaced from each other, in which position the mandrel assembly will be of extended height, the gaps which space the adjacent mandrel segments from each other when the mandrel height is extended being at least as great as the length of a faced projection, the length of the side faces being at least as great as the product of the number of mandrel segments times the length of such a spacing gap, whereby the mandrel segments may be successively dislodged endwise and progressively moved slidingly along the side faces until all segments have been so dislodged, and the height of the mandrel assembly thereby reduced.

4. A progressively collapsible mandrel assembly adapted for collapsing progressively inward from an outboard end toward an inboard end, comprising a mandrel half having a body portion, faced projections of equal height projecting from one side thereof and side faces alternating with and adjacent to said projections, further comprising a plurality of mandrel segments, each having a body portion, two or more correspondingly spaced, faced projections of similar height, and side faces alternating therewith, the mandrel segments being adapted to be positioned along the length of the mandrel half with the projections opposed to and in registration with the projections of the mandrel half and with the adjacent ends of their body portions spaced from each other, in which position the mandrel assembly will be of extended height, the gap which spaces each mandrel segment from the adjacent segment when the mandrel height is extended being at least as great as the length of a faced projection of the mandrel segment on the outboard side of said gap, the length of the side faces of each mandrel segment other than that at the inboard end being at least equal to the total of the length of a projection of the particular segment and the sum of the gap lengths from the inner end of said segment to the said inboard end segment.

5. For use in manufacturing an elongated hollow article, a collapsible internal mandrel assembly comprising a principal mandrel member whose length substantially equals that of the article to be manufactured thereon, said mandrel member having along one side a work-engaging surface and having along the side opposite thereto a series of spaced projections, each having a face whose surface is parallel to the lengthwise direction of the principal mandrel member, in combination with a plurality of mandrel segments, whose combined length substantially equals the length of the principal mandrel member, each segment having a work-engaging surface along one side and a plurality of projections along the opposite side, each projection having a face parallel to the lengthwise direction, the length and spacing of the successive projections of each mandrel segment coinciding with those of successive projections at corresponding positions along the length of the principal mandrel member, the total of the thickness of the principal mandrel member and the height of its projections together with the thickness of the mandrel segments and the height of their projections equalling the inside height of such hollow article to be manufactured thereon, whereby to establish such inside height therefor when the mandrel segments are arranged with the faces of their projections abutting the faces of the said corresponding projections of the principal mandrel member, the mandrel segments having end portions extending lengthwise beyond their said projections an amount less than the spaces between the projections by at least the length of a face of said projections, so as to provide a gap between adjacent segments, whereby when the mandrel segments are so arranged, on moving a segment lengthwise toward an adjacent segment, its projections are first dislodged retractably from the projections on the principal mandrel member and on further movement its end portion contacts the end portion of the adjacent segment and causes it to be dislodged retractably.

6. A mandrel assembly as defined in claim 5, the projections of the principal mandrel member and the mandrel segments being spaced from adjacent projections a distance not less than the total of the gaps between adjacent segments when same are arranged on the mandrel member in abutting relationship as aforementioned.

References Cited in the file of this patent

UNITED STATES PATENTS

| | | |
|---|---|---|
| 2,503,431 | Bender | Apr. 11, 1950 |
| 2,594,095 | Torregrossa | Apr. 22, 1952 |
| 2,676,371 | Venner | Apr. 27, 1954 |